United States Patent
Sidorin et al.

(10) Patent No.: US 7,248,405 B2
(45) Date of Patent: Jul. 24, 2007

(54) RE-FOCUSING MECHANISM FOR IMAGING SYSTEM

(75) Inventors: Yakov Sidorin, Tucson, AZ (US); David L. Lunt, deceased, late of Tucson, AZ (US); by Geraldine Hogan, legal representative, Tucson, AZ (US)

(73) Assignee: Coronado Instruments, Inc., Irvine, CA (US)

( * ) Notice: Subject to any disclaimer, the term of this patent is extended or adjusted under 35 U.S.C. 154(b) by 34 days.

(21) Appl. No.: 11/123,946

(22) Filed: May 5, 2005

(65) Prior Publication Data

US 2005/0248841 A1 Nov. 10, 2005

Related U.S. Application Data

(60) Provisional application No. 60/568,491, filed on May 6, 2004.

(51) Int. Cl.
*G02B 23/00* (2006.01)
(52) U.S. Cl. ............... 359/431; 359/834; 359/857; 359/862; 359/863

(58) Field of Classification Search ................ None
See application file for complete search history.

(56) References Cited

U.S. PATENT DOCUMENTS

| | | | | |
|---|---|---|---|---|
| 3,076,380 A * | 2/1963 | Brockway | .................... | 353/39 |
| 4,812,613 A * | 3/1989 | Gorisch | ................. | 219/121.74 |
| 4,983,043 A * | 1/1991 | Harding | ...................... | 356/606 |
| 5,097,110 A * | 3/1992 | Hamada et al. | ......... | 219/121.63 |
| 5,237,446 A * | 8/1993 | Takahashi | ................... | 359/359 |
| 5,321,547 A * | 6/1994 | Zapp | .......................... | 359/431 |

* cited by examiner

*Primary Examiner*—Arnel Lavarias
(74) *Attorney, Agent, or Firm*—Antonio R. Durando

(57) ABSTRACT

Two reflective surfaces disposed in a predetermined angular orientation inside the optical tube assembly of a telescope intercept the optical beam and deliver it from the objective to the eye-piece. By translating these surfaces simultaneously along the axis bisecting the angle between them, the separation between the focal points of the objective and the eye-piece is adjusted as required to re-focus the telescope in a continuous and reversible fashion without changing its overall dimensions.

28 Claims, 6 Drawing Sheets

RE-FOCUSING MECHANISM FOR IMAGING SYSTEM

RELATED APPLICATIONS

This application is based on and claims the priority of U.S. Provisional Application Ser. No. 60/568,491, filed May 6, 2004.

BACKGROUND OF THE INVENTION

1. Field of the Invention

This invention relates to the general field of optical instrumentation and, in particular, to methods and mechanisms for adjusting the position of the focal point of optics in the optical path of imaging systems.

2. Description of the Prior Art

Optical telescopes and their basic components (such as the objective, the eye-piece, and the telescopic optical-tube assembly) are some of the oldest types of optical instrumentation known in the art. They are fabricated by very diverse manufacturers and are often built according to custom designs. As a result of this diversity of fabrication, some opto-mechanical standards in the telescope industry have not been established or strictly maintained.

As an illustration, a typical eye-piece 10, shown schematically in FIG. 1, consists of an eye-piece lens 12 mounted inside an eye-piece tube 14. Due to the fact that different manufacturers use eye-piece tubes of various lengths and mount the lenses in different positions inside these tubes, the distance 1 between the focal point $F_E$ of the lens 12 and the edge 16 of the tube in otherwise optically equivalent eye-pieces differs from manufacturer to manufacturer. Similarly, as shown in FIG. 2, there is no established standard for positioning the lens 18 of an objective 20 within its housing 21 (known as the objective cell), nor are there standard objective cells. As a result, the exact position of the focal point $F_O$ of the objective lens 18 with respect to its housing 21 also differs from case to case.

Therefore, when a typical telescope 30 is assembled conventionally by combining an eye-piece 10 with an objective 20, the focal points $F_O$, $F_E$ of the objective lens 18 and of an eye-piece lens 12, respectively, are invariably separated from each other by a distance d, as illustrated in FIG. 2. For proper operation of the telescope 30, it is required that the foci $F_O$, $F_E$ of the coaxial objective anti eye-piece lenses 18, 12 coincide in space. Thus, to compensate for the distance d separating the foci (i.e., to re-focus the telescope), a conventional focusing mechanism is used to mechanically translate the eye-piece and/or the objective lenses with respect to each other along the axis 32 of the telescope. Such a focusing mechanism 33 is typically attached externally to the optical tube assembly 34 of the telescope.

For the purposes of this invention, the optical tube assembly (OTA) of a telescope is the portion of the telescope housing connecting the objective cell to the eye-piece. Often additional optical elements are located inside the OTA along the optical train prior to the eye-piece. Conventional focusing mechanisms (not shown in FIG. 2) typically operate as mechanically driven telescope tubes (either threaded, sliding, or geared) adapted to change the dimensions of the telescope (its so-called "foot-print") by either extending or contracting the OTA.

The optical path of the telescope between the objective lens and its focus is often appropriately folded to reduce the overall dimensions of the instrument. This is typically achieved by positioning secondary mirrors between the objective and the eye-piece at an angle designed to reflect the beam away from its initial direction of propagation. As a result, the length of the OTA is reduced at the expense of increasing its lateral dimension. The need for a focusing mechanism, however, exists regardless of whether the imaging system of the telescope is folded or linear. Therefore, when using a conventional focusing mechanism, it is not possible to have a working telescope of fixed dimensions (foot-print), which represents a problem for miniaturization purposes or when the telescope is part of a larger opto-mechanical system that is subject to dimensional constraints.

To the extent that mere mechanical adjustment of the length of any part of the telescopic housing is used for re-focusing the telescope, this limitation is unavoidable. Thus, there remains a need for a focusing mechanism that allows the manufacture of a telescope of fixed dimension, especially in miniaturized implementations.

SUMMARY OF THE INVENTION

This invention provides a different approach for re-focusing a telescope (i.e., bringing the foci of the objective and eye-piece lenses to the same point) which requires no mechanical translation of the objective and/or the eye-piece lenses with respect to one another and no variation in the overall dimensions of the telescope. The invention is based on the fact that inserting two reflecting surfaces disposed at an angle with respect to one another in a converging beam produces a change in the axial position of the point of convergence of the beam that is a function of the placement of the reflecting surfaces. This change is achieved simply by repositioning the surfaces along the line bisecting the angle between them.

Based on this concept, a novel focusing mechanism according to the invention consists of a conventional pentaprism inserted in the optical beam behind the objective lens of a telescope so that the front facet of the prism is positioned perpendicular to the local axis of the beam. By translating the prism along its major axis (which bisects the apex angle of the prism), the focal point of the objective lens is shifted along the local axis of the beam by an amount dependent on the degree of insertion of the prism into the beam. Such axial shift of the focal point is not accompanied by any lateral shift. As a result, re-focusing of the telescope may be achieved without changing the relative position of the objective and the eye-piece lenses, thereby eliminating the need to vary the dimensions of the telescope.

According to another aspect of the invention, the focal shift may be achieved in continuous, variable, and reversible fashion in either direction along the local optical axis. This property allows for the use of various eye-pieces within the same telescopic unit without changing the dimensions of the telescope.

Moreover, the focusing mechanism of the invention folds the optical path, thus eliminating the need for the secondary mirrors used for this purpose in conventional folded telescopes. This is due to the well-known imaging nature of pentaprisms, which fold the incident beam by 90° with respect to its original direction of propagation.

An alternative focusing mechanism consists of two reflecting surfaces positioned at an appropriate angle with respect to one another and adapted to sequentially reflect the objective beam toward the eye-piece of the telescope. These reflecting surfaces can be simultaneously translated along the bisector axis of the angle between them, thereby shifting the focal point of the telescope. According to another aspect of the invention, if the reflecting surfaces are appropriately curved, the mechanism also provides the ability to either slow down or speed up the convergence of the beam, if necessary.

Finally, the focusing mechanism of the invention may also serve as an optical filter with predetermined spectral characteristics, thus adapting the use of the telescope to particular spectroscopic applications.

Various other aspects and advantages of the invention will become clear from the description in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

While the invention is not intended to be limited to telescopes in its application, it has been conceived in that context. Therefore, the invention is described primarily with respect to telescopes, such as used in astronomical and atmospheric imaging and observation.

As used herein, "focusing," "re-focusing" and related terms refer to the process of shifting the position of an image formed by optics along an optical train by the propagation of a light beam. The terms are also intended to refer to the position of the focal point of optics relaying such an image along the optical train. The term "optics" is intended to refer to any system of lenses, mirrors, or other optical elements used in the optical train of a device.

The invention provides a mechanism for focusing a telescope without changing the relative position of the objective and the eye-piece lenses and without changing the overall dimensions of the telescope. This is achieved by intercepting the optical beam (preferably behind the objective lens) with a focusing mechanism consisting of a pair of reflecting surfaces disposed at an angle with respect to each other and movable along the major axis of the focusing mechanism. "Major axis" is defined for the purposes of this disclosure as the straight line bisecting the angle formed by the two reflecting surfaces of the focusing mechanism.

Figure 2:
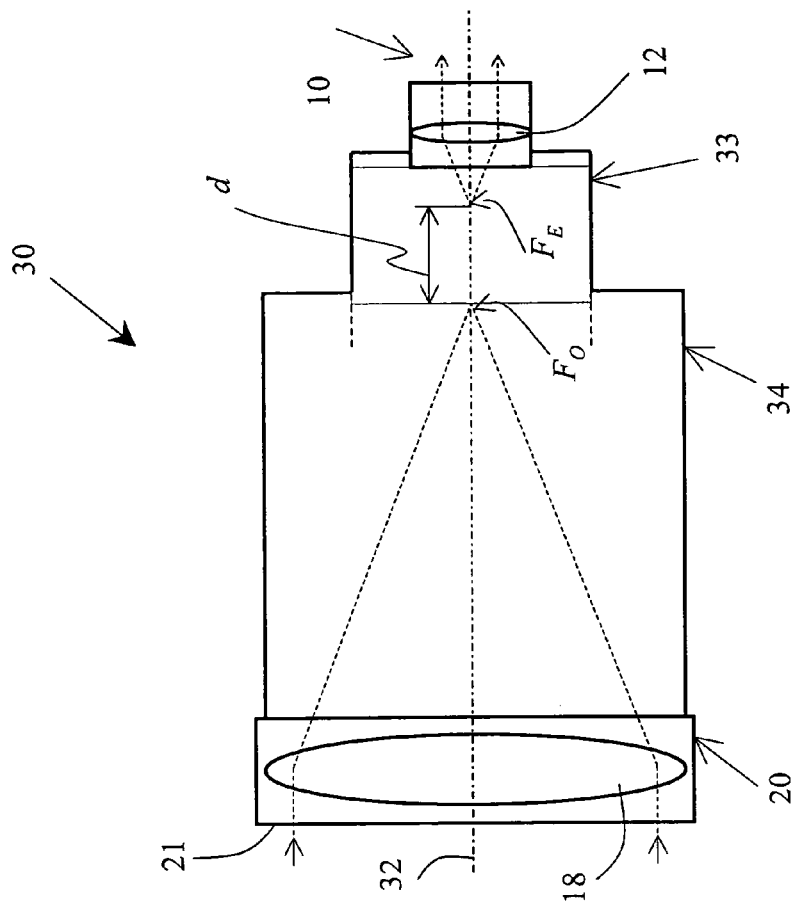
FIG. 2 shows a conventional telescope in side view.
Figure 1:
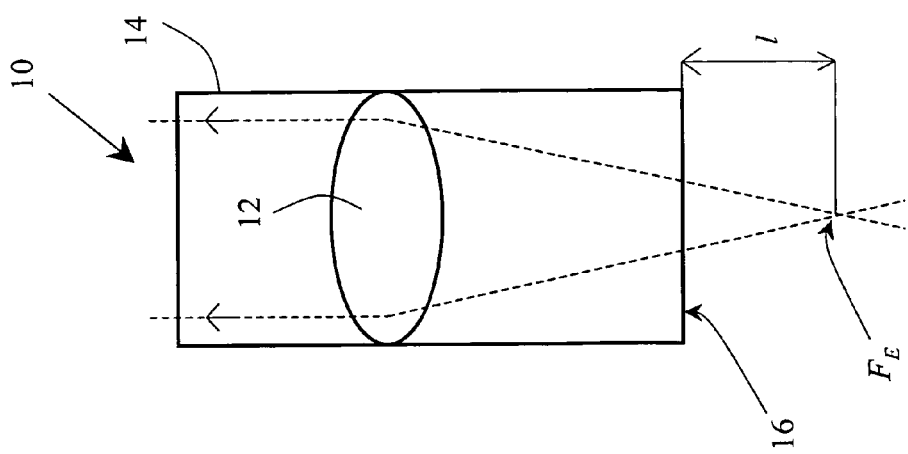
FIG. 1 illustrates schematically an eye-piece consisting of an eye-piece lens mounted within an eye-piece tube.
Figure 3:
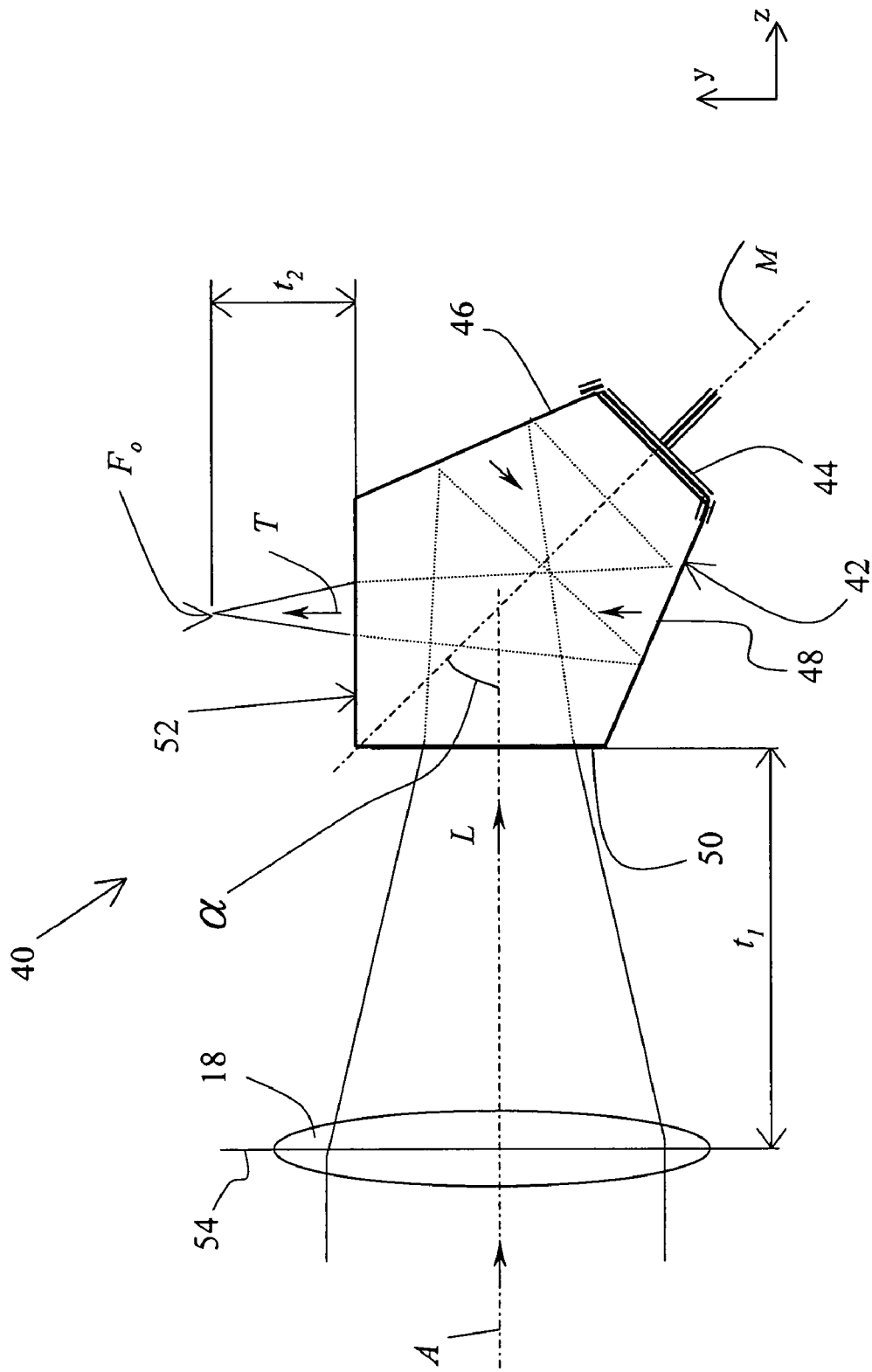
FIG. 3 shows in side view the preferred embodiment of the invention consisting of a pentaprism that is translatable along its major axis to shift the point of convergence of the light beam.

With reference to FIG. 3, a preferred focusing mechanism 40 consists of a pentaprism 42 mounted in a stage 44 which is movable along the major axis M of the pentaprism. The major axis bisects both the angle formed by the reflecting long facets 46,48 of the pentaprism and its apex angle between the input and output facets 50,52. In telescopic applications, the pentaprism 42 is positioned inside the OTA of the telescope at an appropriate distance $t_1$ behind the objective lens 18 with its input facet 50 perpendicular to the incident converging beam L. (The distance $t_1$ is typically defined with respect to the rear principle plane 54 of the objective lens 18.) Thus, the major axis M of the prism 42 forms a 45° angle α with the axis A of the beam L. Although the invention will operate with the pentaprism 42 disposed at a different angle, it is understood that the quality of the image formed by the telescope will be degraded if α≠45°. Therefore, positioning the input facet 50 perpendicular to the optical axis of the telescope is highly preferred. The beam L propagates through the prism 42, sequentially reflecting off the long facets 46,48, and exits the prism as a throughput beam T, toward the focal point $F_O$ of the objective at a distance $t_2$ behind the output facet 52.

Figure 4:
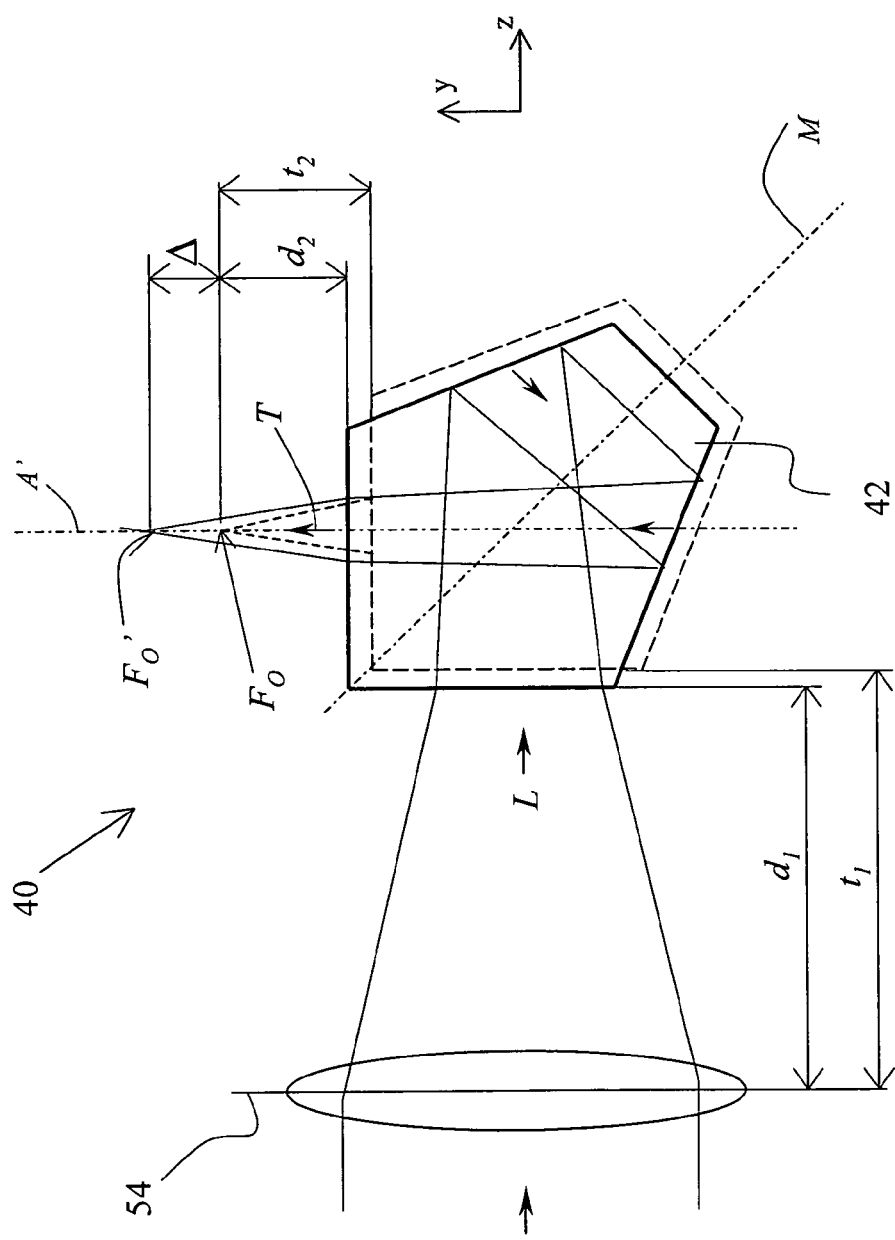
FIG. 4 illustrates the operation of the preferred embodiment of the invention of FIG. 3.
Figure 5:
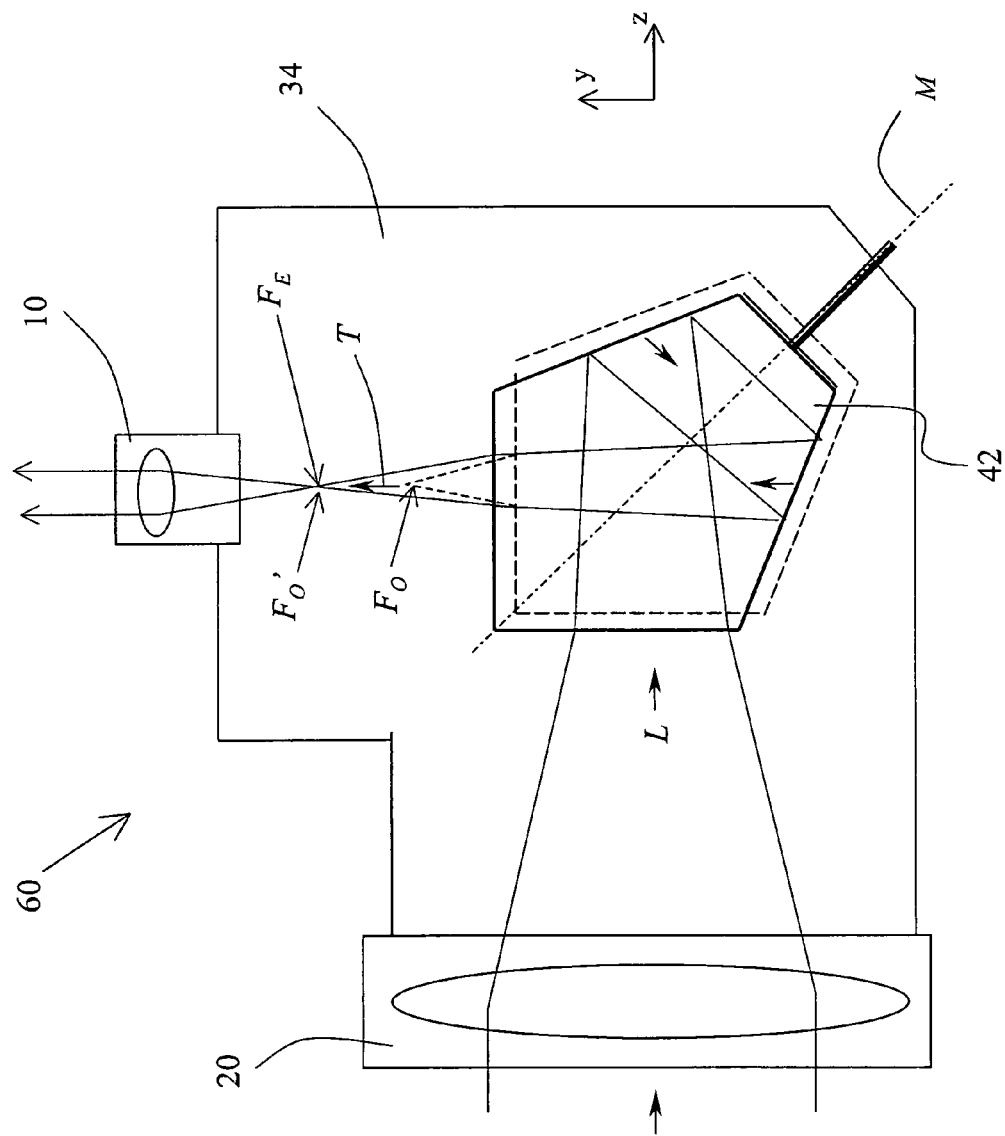
FIG. 5 illustrates schematically the preferred embodiment of a telescope where re-focusing is achieved by translating a pentaprism focuser along its major axis.

In operation, the focusing mechanism 40 is translated along the major axis M, as illustrated in FIG. 4, from its original position (shown in dashed line) to a new position (shown in solid line). As a result, the separation $t_1$ between the pentaprism and the objective lens and the separation $t_2$ between the pentaprism and the point $F_O$ are reduced to $d_1$ and $d_2$, respectively. Therefore, since neither the path length traversed by the beam L within the pentaprism 42 nor the effective focal length of the objective lens 18 depend on the position of the pentaprism within the beam, the focal point of the objective lens is necessarily shifted from $F_O$ to $F_O{}'$ along the local axis A' of the throughput beam T out of the pentaprism. As one skilled in the art would readily understand, the amount of such a shift Δ is equal to the total difference accrued as a result of the translation, $\Delta=(t_1+t_2)-(d_1+d_2)$. In like manner, if the mechanism 40 were translated along the major axis in the opposite direction, the distances $t_1,t_2$ would be extended, which in turn would force the focal point to shift towards the pentaprism. Therefore, translation of the pentaprism along its major axis provides a means for shifting of the focal point $F_O$ of the objective lens towards or away from the focal point $F_E$ of the eye-piece of the telescope, thereby bringing these foci together to re-focus the folded telescope, as shown in the embodiment 60 of FIG. 5.

Figure 6:
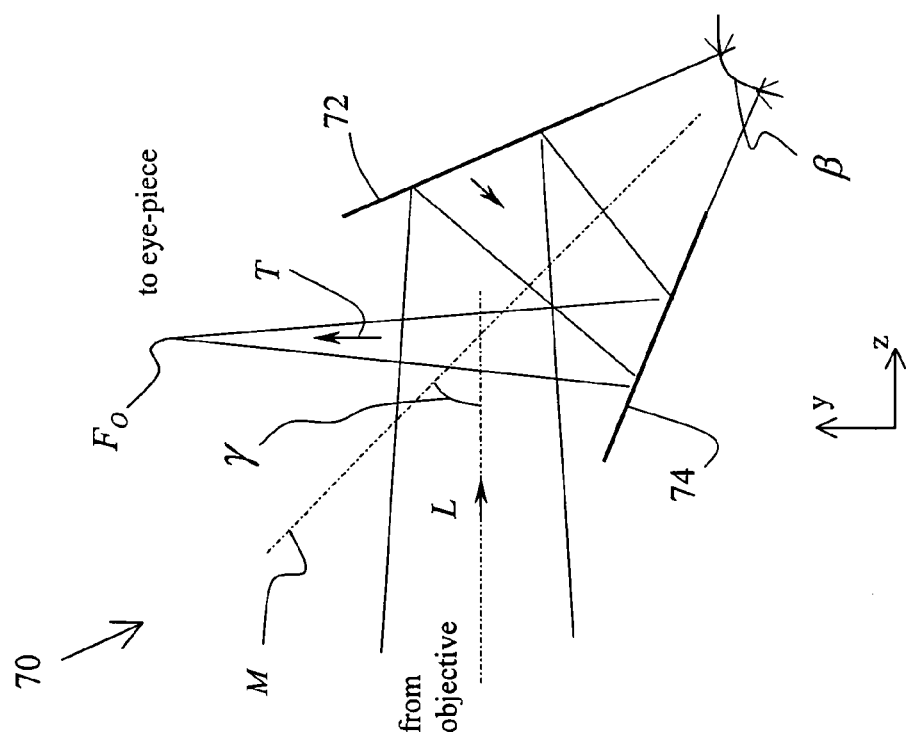
FIG. 6 illustrates an alternative embodiment of the focusing mechanism of the invention comprising two flat reflecting surfaces disposed in a predetermined angular orientation with respect to each other.

An alternative embodiment 70 of the invention is illustrated in schematic view in FIG. 6, where the converging beam L is intercepted in air by two reflecting surfaces 72,74 disposed inside the OTA of a telescope at an angle β with respect to one another (in a manner analogous to the long facets 46,48 of the pentaprism of FIG. 3). The reflecting surfaces 72,74 are rigidly connected to each other and to a stage (not shown) which in operation is translatable along the major axis M of the mechanism 70. The reflecting surfaces 72,74 are positioned in such a way that the major axis forms an angle γ with the axis of the beam L, as shown in FIG. 6. It is understood that values of the angles β and γ not limited as long as the surfaces 72,74 are positioned to sequentially reflect the incident beam L and fold the optical path of the telescope toward the eyepiece. The operation of the alternative embodiment of the invention is analogous to that described with reference to FIGS. 3–5.

Figure 7:
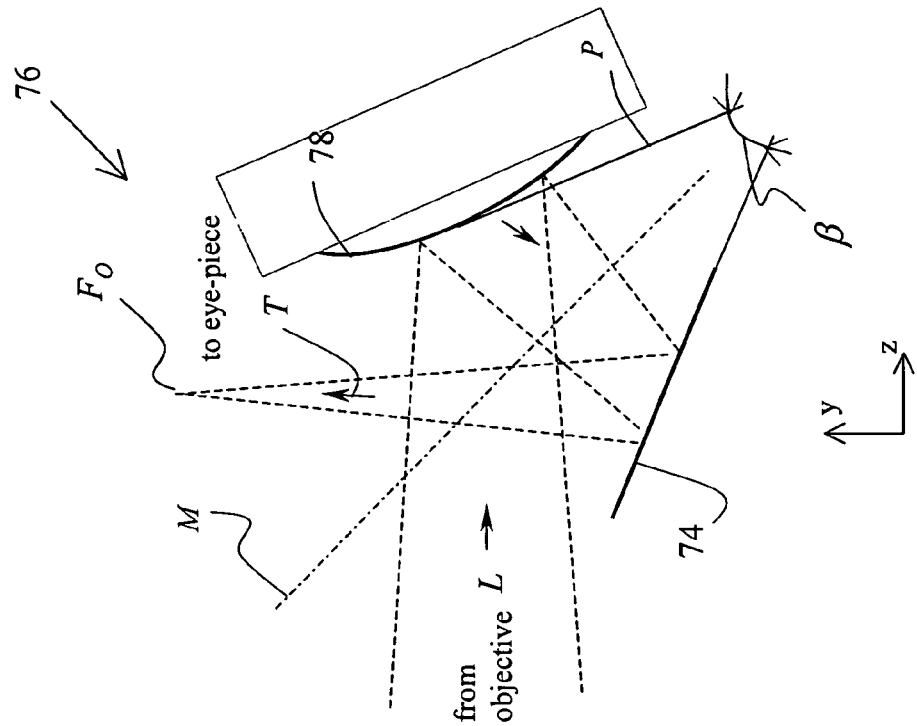
FIG. 7 illustrates another embodiment of the focusing mechanism of the invention comprising a combination of curved and flat reflective surfaces disposed in a predetermined angular orientation with respect to each other.

It is understood that the focusing mechanism of the invention is not limited to the combination of two flat reflecting surfaces, but it can be formed by the combination of appropriately curved reflectors. This provides an additional degree of freedom in refocusing the beam L by either slowing down or speeding up the rate of convergence of the beam. For example, FIG. 7 shows an alternative embodiment 76 of the invention with reflectors 78,74 where the first reflecting surface 78 has an appropriate negative radius of curvature, thus additionally defocusing the reflected beam by a required amount. The major axis M in this case is defined as the line bisecting the angle β formed by the plane surface 74 and the plane P that is tangential to the curved surface 78 in the middle of the incident beam L.

Figure 8:
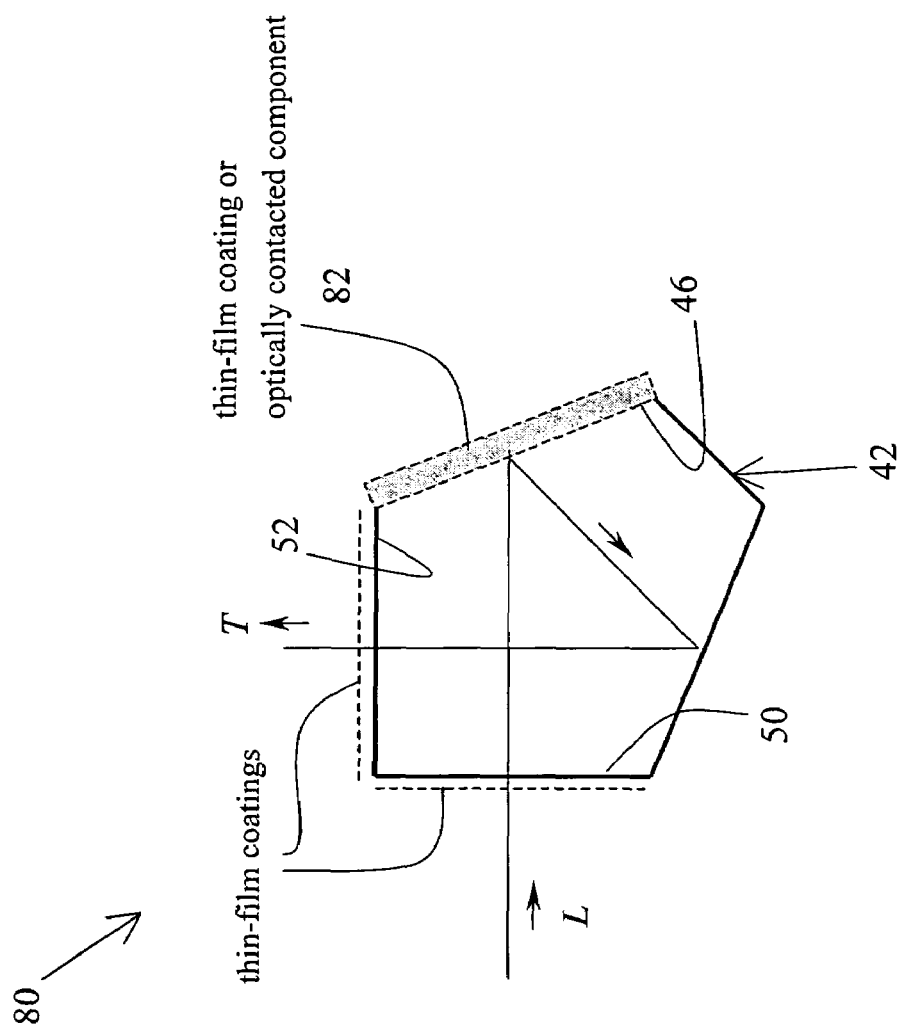
FIG. 8 shows in side view a modified embodiment of the invention of FIG. 3 wherein the optical properties of the pentaprism are changed by deposition of thin-film coatings and the addition of an optical element.

To the extent that a prism component is used in the preferred embodiment of the focusing mechanism of the invention, the surfaces of the prism may also be appropriately modified to alter the spectral distribution of the light reaching the focal point of the objective lens. For example, as shown in the embodiment 80 of FIG. 8, the surfaces 46,50,52 of the prism 42 of the focusing mechanism 40 of FIG. 3 can be thin-film coated or brought in optical contact with another appropriately prepared component (such as optical plate 82), which would modify the spectral distribution of the optical properties of each respective surface.

It is also clear that the invention can be carried out by utilizing any suitably movable prism or combination of prisms and/or reflecting surfaces which, operating together, appropriately fold the beam of light upon its propagation through the set. For example, an embodiment based on the use of right-angle or Amici prisms would require translation along the bisector of the right angle of the prisms, while an embodiment with a penta-Amici prism combination would require translation along the major axis of the pentaprism component.

Finally, those skilled in the art will readily understand that the re-focusing approach and mechanism of the invention are applicable both to systems where the object and/or the image are at infinity and to systems where either is at a finite distance from the optics. In such cases, the image formed by the front portion of the optical train will not coincide with its focal surface. Similarly, the focal point of the back portion of the optical train will not coincide with the intermediate object surface imaged by the back portion of the train to form the final image. Therefore, it is the position of the intermediate image formed by the front portion of the optical train (and/or of the intermediate object surface imaged by the back portion of the train) that is being shifted in these cases.

Thus, while the invention has been shown and described in what are believed to be the most practical and preferred embodiments, it is recognized that departures can be made therefrom within the scope of the invention, which is therefore not to be limited to the details disclosed herein, but is to be accorded the full scope of the claims so as to embrace any and all equivalent apparatus and methods.

We claim:

1. Apparatus for re-focusing an optical device propagating a light beam along an optical axis of an optical train, comprising:
    a first reflective surface and a second reflective surface disposed in a predetermined angular relationship defining a bisecting axis, the first reflective surface being adapted to receive said light beam to produce a reflected beam, and the second reflective surface being adapted to receive the reflected beam to produce an output beam; and
    a mechanism for translating the reflective surfaces along the bisecting axis;
    wherein said first and second surfaces are long facets of a pentaprism, and
    wherein at least one of said reflective surfaces is characterized by a curvature selected to affect a rate of convergence of the beam propagated therethrough.

2. The apparatus of claim 1, wherein at least one of said reflective surfaces is coated with a material selected to affect an optical property thereof.

3. The apparatus of claim 1, further including an optical element in optical contact with at least one of said reflective surfaces to affect an optical property thereof.

4. The apparatus of claim 1, wherein the pentaprism is positioned with an input facet normal to the light beam.

5. Apparatus for re-focusing an optical device propagating a light beam along an optical axis of an optical train, comprising:
    a first reflective surface and a second reflective surface disposed in a predetermined angular relationship defining a bisecting axis, the first reflective surface being adapted to receive said light beam to produce a reflected beam, and the second reflective surface being adapted to receive the reflected beam to produce an output beam; and
    a mechanism for translating the reflective surfaces along the bisecting axis;
    wherein at least one of said reflective surfaces is characterized by a curvature selected to affect a rate of convergence of the beam propagated therethrough; and
    wherein said first reflective surface is reflecting said light beam at a location ahead of a focal point of a preceding optical element in said optical train, thereby shifting a position of an image formed by said preceding optical element.

6. The apparatus of claim 5, wherein at least one of said reflective surfaces is coated with a material selected to affect an optical property thereof.

7. The apparatus of claim 5, further including an optical element in optical contact with at least one of said reflective surfaces to affect an optical property thereof.

8. Apparatus for re-focusing an optical device propagating a light beam along an optical axis of an optical train, comprising:
    a first reflective surface and a second reflective surface disposed in a predetermined angular relationship defining a bisecting axis, the first reflective surface being adapted to receive said light beam to produce a reflected beam, and the second reflective surface being adapted to receive the reflected beam to produce an output beam; and
    a mechanism for translating the reflective surfaces along the bisecting axis;
    wherein at least one of said reflective surfaces is characterized by a curvature selected to affect a rate of convergence of the beam propagated therethrough; and
    wherein said first reflective surface is reflecting said light beam at a location past a focal point of a subsequent optical element in said optical train, thereby shifting a position of an intermediate object surface imaged by said subsequent optical element.

9. The apparatus of claim 8, wherein at least one of said reflective surfaces is coated with a material selected to affect an optical property thereof.

10. The apparatus of claim 8, further including an optical element in optical contact with at least one of said reflective surfaces to affect an optical property thereof.

11. Apparatus for re-focusing an optical device propagating a light beam along an optical axis of an optical train, comprising:
  a first reflective surface and a second reflective surface disposed in a predetermined angular relationship defining a bisecting axis, the first reflective surface being adapted to receive said light beam to produce a reflected beam, and the second reflective surface being adapted to receive the reflected beam to produce an output beam; and
  a mechanism for translating the reflective surfaces along the bisecting axis;
  wherein said optical device is a telescope comprising an objective and an eye-piece, said first and second surfaces are long facets of a pentaprism, the pentaprism is positioned with an input facet normal to the light beam, and the first reflective surface is reflecting said light beam at a location ahead of a focal point of said objective, thereby shifting a position of an image formed by the objective of the telescope.

12. An optical telescope comprising:
  an objective having an objective focal point;
  a first reflective surface and a second reflective surface disposed in a predetermined angular relationship defining a bisecting axis, the first reflective surface being adapted to receive a light beam from the objective to produce a reflected beam, and the second reflective surface being adapted to receive the reflected beam to produce an output beam; and
  an eye piece with an eye-piece focal point placed along an optical path of the output beam; and
  a mechanism for translating the reflective surfaces along the bisecting axis, thereby changing a position of the objective focal point along the optical path of the output beam as necessary for the objective focal point to coincide with said eye-piece focal point.

13. The optical telescope of claim 12, wherein said first and second surfaces are long facets of a pentaprism.

14. The optical telescope of claim 13, wherein the pentaprism is positioned with an input facet normal to the light beam.

15. The optical telescope of claim 13, wherein at least one of said reflective surfaces is characterized by a curvature selected to affect a rate of convergence of the light beam propagated therethrough.

16. The optical telescope of claim 13, wherein at least one of said reflective surfaces is coated with a material selected to affect an optical property thereof.

17. The optical telescope of claim 13, further including an optical element in optical contact with at least one of said reflective surfaces to affect an optical property thereof.

18. The optical telescope of claim 12, wherein at least one of said reflective surfaces is characterized by a curvature selected to affect a rate of convergence of the light beam propagated therethrough.

19. The optical telescope of claim 12, wherein at least one of said reflective surfaces is coated with a material selected to affect an optical property thereof.

20. The optical telescope of claim 12, further including an optical element in optical contact with at least one of said reflective surfaces to affect an optical property thereof.

21. A method for re-focusing an optical device propagating a light beam along an optical axis of an optical train, comprising:
  providing a first reflective surface and a second reflective surface disposed in a predetermined angular relationship defining a bisecting axis;
  reflecting the light beam on the first reflective surface to produce a reflected beam;
  reflecting the reflected beam on the second reflective surface to produce an output beam; and
  translating the reflective surfaces along the bisecting axis;
  wherein at least one of said reflective surfaces is characterized by a curvature selected to affect a rate of convergence of the beam propagated therethrough; and
  wherein said first and second surfaces are long facets of a pentaprism.

22. The method of claim 21, wherein at least one of said reflective surfaces is coated with a material selected to affect an optical property thereof.

23. The method of claim 21, further including the step of providing an optical element in optical contact with at least one of said reflective surfaces to affect an optical property thereof.

24. The method of claim 21, wherein said step of reflecting the light bean is carried out at a location past a focal point of a subsequent optical element in said optical train, thereby shifting a position of an intermediate object surface imaged by said subsequent optical element.

25. A method for re-focusing an optical device propagating a light beam along an optical axis of an optical train, comprising:
  providing a first reflective surface and a second reflective surface disposed in a predetermined angular relationship defining a bisecting axis;
  reflecting the light beam on the first reflective surface to produce a reflected beam;
  reflecting the reflected beam on the second reflective surface to produce an output beam; and
  translating the reflective surfaces along the bisecting axis;
  wherein at least one of said reflective surfaces is characterized by a curvature selected to affect a rate of convergence of the beam propagated therethrough; and
  wherein said step of reflecting the light beam is carried out at a location ahead of a focal point of a preceding optical element in said optical train, thereby shifting a position of an image formed by said preceding optical element.

26. The method of claim 25, wherein at least one of said reflective surfaces is coated with a material selected to affect an optical property thereof.

27. The method of claim 25, further including the step of providing an optical element in optical contact with at least one of said reflective surfaces to affect an optical property thereof.

28. The method of claim 25, wherein said step of reflecting the light beam is carried out at a location past a focal point of a subsequent optical element in said optical train, thereby shifting a position of an intermediate object surface imaged by said subsequent optical element.

* * * * *

UNITED STATES PATENT AND TRADEMARK OFFICE
CERTIFICATE OF CORRECTION

PATENT NO. : 7,248,405 B2  Page 1 of 1
APPLICATION NO. : 11/123946
DATED : July 24, 2007
INVENTOR(S) : Sidorin et al.

It is certified that error appears in the above-identified patent and that said Letters Patent is hereby corrected as shown below:

Column 7, line 45, cancel the text "15. The optical telescope of claim 13," and insert the following text: --15. The optical telescope of claim 12,--;

Column 7, line 49, cancel the text "16. The optical telescope of claim 13," and insert the following text: --16. The optical telescope of claim 12,--;

Column 7, line 52, cancel the text "17. The optical telescope of claim 13," and insert the following text: --17. The optical telescope of claim 12,--;

Column 7, line 55, cancel the text "18. The optical telescope of claim 12," and insert the following text: --18. The optical telescope of claim 13,--;

Column 7, line 59, cancel the text "19. The optical telescope of claim 12," and insert the following text: --19. The optical telescope of claim 13,--;

Column 7, line 62, cancel the text "20. The optical telescope of claim 12," and insert the following text: --20. The optical telescope of claim 13,--.

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,248,405 B2  Page 1 of 1
APPLICATION NO. : 11/123946
DATED : July 24, 2007
INVENTOR(S) : Sidorin et al.

It is certified that error appears in the above-identified patent and that said Letters Patent is hereby corrected as shown below:

Column 7, line 45, cancel the text "15. The optical telescope of claim 13," and insert the following text: --15. The optical telescope of claim 12,--;

Column 7, line 49, cancel the text "16. The optical telescope of claim 13," and insert the following text: --16. The optical telescope of claim 12,--;

Column 7, line 52, cancel the text "17. The optical telescope of claim 13," and insert the following text: --17. The optical telescope of claim 12,--;

Column 7, line 55, cancel the text "18. The optical telescope of claim 12," and insert the following text: --18. The optical telescope of claim 13,--;

Column 7, line 59, cancel the text "19. The optical telescope of claim 12," and insert the following text: --19. The optical telescope of claim 13,--;

Column 7, line 62, cancel the text "20. The optical telescope of claim 12," and insert the following text: --20. The optical telescope of claim 13,--.

Signed and Sealed this

First Day of January, 2008

JON W. DUDAS
*Director of the United States Patent and Trademark Office*